United States Patent [19]

Alvryd et al.

[11] Patent Number: 4,548,647

[45] Date of Patent: Oct. 22, 1985

[54] METHOD FOR IMPROVING THE FILTERABILITY OF A VISCOSE SOLUTION

[75] Inventors: Karl B. G. Alvryd; Leif E. Elsby, both of Stenungsund; Hans I. Uneback, Ödsmål, all of Sweden

[73] Assignee: Berol Kemi AB, Stenungsund, Sweden

[21] Appl. No.: 607,339

[22] Filed: May 4, 1984

[30] Foreign Application Priority Data

May 5, 1983 [SE] Sweden ............................ 8302564

[51] Int. Cl.$^4$ ............................................. C08L 1/24
[52] U.S. Cl. ...................................... 106/164; 106/165
[58] Field of Search ........................ 166/164; 106/165

[56] References Cited

U.S. PATENT DOCUMENTS

| 2,792,313 | 5/1957 | Charles et al. | 106/164 |
| 3,182,107 | 5/1965 | Howsmon et al. | 106/165 |
| 3,843,378 | 10/1974 | Smith | 106/165 |
| 4,025,353 | 5/1977 | Wahlen | 106/165 |
| 4,340,429 | 7/1982 | Mayer | 106/164 |

FOREIGN PATENT DOCUMENTS 1185331 1/1965 Fed. Rep. of Germany .
1271118 4/1972 United Kingdom .

OTHER PUBLICATIONS

Chem. Abstract 83:30168s.

Primary Examiner—Theodore Morris

[57] ABSTRACT

The present invention provides a method for improving the filterability of a viscose solution by adding prior to the xanthation an ester compound containing alkyleneoxy units.

9 Claims, No Drawings

METHOD FOR IMPROVING THE FILTERABILITY OF A VISCOSE SOLUTION

When preparing a viscose it is important to add, at a suitable point in the process, an agent which improves the filterability of the viscose solution. Improved filterability is obtained by the ability of the agent to reduce the formation of gel particles in the viscose solution. As an additional effect, certain specially suitable agents provide fibers or films with less cloudiness and higher brightness.

German Pat. No. 1,176,633, the U.S. Pat. No. 2,792,313, and the British Pat. No. 1,271,118 assert that the addition of different alkylene oxide adducts improves the filterability of viscose solutions, but the effects obtained are usually insufficient. The addition to the viscose solution of polyalkylene oxides, polyaminepolyglycolethers, ethoxylated polyalcohols or ethoxylated castor oils as swelling-decreasing and modifying agents is described in the German Pat. No. 1,185,331. However, these additions have no or only a minor effect on the filterability of the viscose solution, because they are not made at the right time.

According to the present invention it has now proved possible to prepare a viscose solution with very good filterability by the addition, prior to the xanthation, of certain types of esters containing alkyleneoxy units. Further, the method according to the invention can be applied to all types of chemical pulp used in the manufacture of viscose. Both sulphite and sulphate pulps, viscose pulps and high yield pulps (with low α-cellulose content), and pulps from different fibrous raw materials such as wood, grass, bagasse, may well be used. Cellulose pulps with resin contents from 0.002 to 0.5% by weight can suitably be used in the method according to the invention.

The aim of the invention is achieved by adding during the preparation of viscose solution but before the xanthation 0.01-1.0%, preferably 0.05-0.5%, calculated on the weight of the pulp, of a compound with the general formula

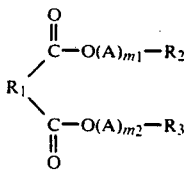

where $R_1$ is a hydrocarbon group with 0-20, preferably 2-20 carbon atoms; A is an alkyleneoxy unit derived from alkylene oxide with 2-4 carbon atoms, provided that at least 50% of the number of the alkyleneoxy units are ethyleneoxy units; $m_1$ and $m_2$ are numbers from 0 to 30, the total of $m_1+m_2$ being 2-60; $R_2$ and $R_3$ are hydrocarbon groups with 1-24 carbon atoms or hydrogen provided that $R_2$ and $R_3$ are not simultaneously hydrogen, or $$R_4[O(A)_{m_3}R_5]_n \quad \text{II}$$

where $R_4$ is an aliphatic group with 2-24 carbon atoms with 0-2 mitrogen atoms; $R_5$ is an acyl group with 1-24 carbon atoms or hydrogen, provided that all $R_5$ are not simultaneously hydrogen; $m_3$ is a number from 0 to 30, the total of all $m_3$ being a number from 2 to 100; n is a number from 2 to 6, and A has the meaning given in formula I; or an alkoxylated castor oil III, where 1 mole castor oil is alkoxylated with 8-100 moles of alkylene oxide; provided that at least 50% of the amount of alkyleneoxy units are ethyleneoxy units.

The numbers of m, $m_2$, and $m_3$ are average numbers.

Preferred compounds with the formula I are those where $R_1$ is a hydrogen group with 2-6 carbon atoms such as the phenylene group, A consists of at least 75% ethyleneoxy units, the total of $m_1$ and $m_2$ is 8-45, and $R_2$ and $R_3$ are hydrocarbon groups of four to twelve carbon atoms.

Of the compounds with the formula II the ones are preferred where $R_4$ is an aliphatic group with 2-12 carbon atoms and 0-1 nitrogen atoms, $R_5$ is an acyl group with 2-22 carbon atoms, the total of all $m_3$ is a number from 8 to 50, n is a number 2-4 and A consists of at least 75% ethyleneoxy units. Preferred alkoxylated castor oil III is such a compound where the amount of alkyleneoxy units per mole of castor oil is 25-70, preferably 30-60, and the alkyleneoxy units consist of at least 75% ethyleneoxy units.

The compounds comprised by the method according to the invention can all be produced according to methods known per se. Thus, the compound I can be produced by the alkoxylation of the compound $R_2OH$ and/or $R_3OH$, $R_2$ and $R_3$ having the above meaning, with a suitable amount of alkylene oxide with 2-4 carbon atoms, and esterification of the alkylene oxide adduct obtained with a dicarboxylic acid with the formula

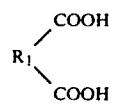

where $R_1$ has the above meaning.

Examples of suitable compounds with the formula $R_2OH$ or $R_3OH$ are hexanol, octanol, such as 2-ethylhexanol, decanol, dodecanol, tetradecanol and hexadecanol and isomers thereof as well as phenol and substituted phenols. Examples of suitable dicarboxylic acids are oxalic acid, fumaric acid, maleic acid, succinic acid, adipic acid, glutaric acid, phthalic acid, isophthalic acid and terephthalic acid.

Compounds with the formula II can be produced in a similar manner. First a hydroxylic compound $R_2(OH)_n$ can be alkoxylated with a suitable amount of alkylene oxide, and then the alkylene oxide adduct obtained can be reacted with a monocarboxylic acid having the formula $R_5OH$, where $R_5$ has the above meaning, to form the desired compound II.

Examples of suitable hydroxylic compounds are diethanolamine, triethanolamine, ethylenediamine, ethyleneglycol, glycerol, trimethylolpropane, pentaerythritol, erythritol, sorbitol and mannitol and monosaccharides such as glucose and fructose. Examples of suitable monocarboxylic acids are lauric acid, palmitic acid, stearic acid, oleic acid, linoleic acid, linolenic acid, 2-ethylhexanoic acid, butyric acid, valeric acid, caproic acid, caprylic acid and capric acid.

When alkoxylating castor oil the larger part of the alkylene oxide will be added to castor oil at its three ester bonds. An alkoxylated castor oil will therefore contain a segment with the general formula $$\begin{array}{l}H_2C-(A)_\alpha-O-\overset{\overset{O}{\|}}{C}-\\[4pt] HC-(A)_\beta-O-\overset{\overset{O}{\|}}{C}-\\[4pt] H_2C-(A)_\gamma-O-\overset{\overset{O}{\|}}{C}-\end{array}$$

where A has the above given meaning and $\alpha$, $\beta$ and $\gamma$ are integers, the total of $\alpha+\beta+\gamma$ is the number of alkoxy units in the alkoxylated castor oil. Furthermore, a smaller amount, usually less than 20%, of the amount of alkylene oxide will be added to the free hydroxylic groups of the castor oil.

As earlier mentioned, the compounds comprised by the method according to the invention should be added at the latest immediately prior to the beginning of the xanthation. Preferably the compounds are added during the mercerization or to the wet pulp web on the formation machine before the drying section from a water solution or, if the product is soluble also without dilution, by spraying, or by means of rotating rolls or any other mechanical devices. The addition can also be made to the dried pulp or to the alkali cellulose in the xanthation apparatus prior to the xanthation. The effect will fully or almost disappear if the compounds are added in connection with or after the xanthation. All compounds comprised by the method according to the invention have ester structure. This means that they will be, at least partly, hydrolyzed in the alkaline conditions prevailing during the mercerization.

The following Examples illustrate the invention. All percentages in the Examples are by weight if nothing else is stated.

EXAMPLES 1 to 3

A soft-wood sulphate pulp with a 94% $\alpha$-cellulose content and with a resin content of 0.01% was used to prepare the viscose solution. The pulp was mercerized in an 18% aqueous NaOH solution at 53° C. according to the slurry method, and with an addition of 2 kg, calculated per ton of pulp, of a filterability-improving agent according to Table I. A control run was also carried out with no additive in order to determine the effect of the additive. After the removal of excess caustic liquor by pressing and ageing, an alkali cellulose having a 33% cellulose content and 15% NaOH was obtained. Carbon disulphide was added at two levels, 29.5% and 32%, respectively, calculated on the cellulose content in the alkali cellulose. The formed xanthate was dissolved in the NaOH solution so that a viscose with a 10% cellulose content and 5.8% NaOH was obtained. The dissolution took place at 4° C. over three hours.

For the viscose solutions obtained the $k_w$-value (clogging value) was determined. This value is derived from the filtration time and filtrate weight of viscose solutions filtered under normal conditions. The lower the value for $k_w$, the better the filterability of the viscose solution. The clogging value $k_w$ can be characterized as follows:

| $k_w$ | Filterability |
|---|---|
| 0–100 | Excellent |
| 100–200 | Very good |
| 200–400 | Good |
| 400–800 | Acceptable |
| 800–1500 | Bad |
| >1500 | Very bad |

The filterability-improving agents tested according to this Example gave the following result:

TABLE I

| | | $k_w$ | |
|---|---|---|---|
| Example | Additive | 29.5% $CS_2$ | 32% $CS_2$ |
| 1 | 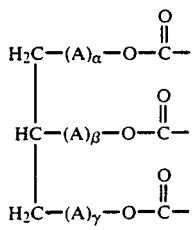 $-CO(C_2H_4O)_{m_1}$—2-ethylhexyl  $-CO(C_2H_4O)_{m_2}$—2-ethylhexyl   where $m_1 + m_2 = 30$ | 150 | 83 |
| 2 | Alkoxylated castor oil (1 mole castor oil + 6 moles propylene oxide + 40 moles ethylene oxide) | * | 125 |
| 3 | $N{\begin{array}{l}-C_2H_4O-(C_2H_4O)_{m_3}-acyl_{soya}\\-C_2H_4O-(C_2H_4O)_{m_3}-acyl_{soya}\\-C_2H_4O-(C_2H_4O)_{m_3}-H\end{array}}$   where the total of $m_3$ is 20 | * | 100 |
| Control | None | 3000 | 1000 |

*not performed

The results show that the compounds according to the invention, i.e. the compounds in Examples 1 to 3 have excellent or very good filterability-improving properties.

EXAMPLES 4 and 5

A soft-wood sulphite pulp with a 92% $\alpha$-cellulose content and with a resin content of 0.2% was used to prepare the viscose solution. The pulp was mercerized in an aqueous NaOH solution with an NaOH concentration of 215 g/l at a temperature of 50° C., according to the slurry method. The NaOH solution contained also 35 g/l hemicellulose. Thereafter, 2 kg per ton of cellulose of the filterability improving compound mentioned in Table II was added. After pressing and ageing, an alkali cellulose with a 33% cellulose content and 15% NaOH was obtained. Carbon disulphide was added at two levels, at 28% and 32%, respectively, calculated on the cellulose in the alkali cellulose. The formed xanthate was dissolved in an NaOH solution at +10° C., so that a viscose solution with a 10% cellulose content and 6% NaOH was obtained.

The filterability was determined as $FZ_{60}$-values according to *Zell Cheming Merkblatt III/6/68*. The $FZ$-values were correlated to a falling-ball viscosity of 60 sec. and are therefore denoted by $FZ_{60}$. The lower the $FZ_{60}$-value, the better the filterability of the viscose. The $FZ_{60}$ values can be characterized in the following manner:

| $FZ_{60}$ | Filterability |
|---|---|
| <70 | Excellent |
| 70–100 | Very good |
| 100–150 | Good |

The following results were received:

TABLE II

| Example | Additive | $k_w$ 28% $CS_2$ | 32% $CS_2$ |
|---|---|---|---|
| 4 | 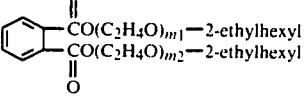  where $m_1 + m_2 = 30$ | 95 | 76 |
| 5 | 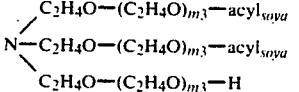  where the total of $m_3$ is 5 | 98 | 87 |
| Control | None | 123 | 96 |

From the results it is evident that the compounds of Examples 4 and 5 give a viscose with considerably improved filterability.

EXAMPLE 6

A softwood sulphite pulp with an 85% α-cellulose content and with a resin content of about 0.4% was used to prepare the viscose. The pulp was mercerized in an 18% NaOH solution, which also contained 35 g/l hemicellulose, at a temperature of 40° C., according to the slurry method. The filterability-improving compound in Example 1 was added in the amount of 2 kg/ton cellulose. For comparison also a control with no additive was carried out. After pressing, an alkali cellulose with a 33% cellulose content and 15% NaOH was obtained. Carbon disulphide was added at 36%, calculated on the cellulose in the alkali cellulose. The formed xanthate was dissolved in an NaOH solution at +10° C., so that a viscose solution of 9% cellulose content and 5% NaOH was obtained. The filterability for the viscose solutions obtained was determined as $k_w$-values. The viscose solution prepared according to the invention had a $k_w$-value of 100, while the viscose solution prepared without the addition of any filterability improving agent had a $k_w$ of 300.

EXAMPLES 7 to 10

A soft-wood sulphate pulp haing a 94% α-cellulose content and with a resin content of 0.01% was used to prepare the viscose. The pulp was mercerized in an 18% aqueous NaOH solution at 53° C., according to the slurry method and with an addition of 2 kg, calculated per ton of pulp, of the filterability improving agents shown in Table III. After the removal of excess caustic liquor by pressing and ageing, an alkali cellulose with 33% cellulose content and 15% NaOH was obtained. Carbon disulphide was added at two levels, i.e. at 29.5% and 32%, respectively, calculated on the cellulose content in the alkali cellulose. The formed xanthate was dissolved in the NaOH solution, so that a viscose with a 10% cellulose content and 5.8% NaOH was obtained. The dissolution took place at 4° C. over three hours.

The filterability improving agents were as follows:

TABLE III

| Example | Additive |
|---|---|
| 7 | 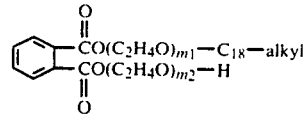  $m_1 + m_2 = 30$ |
| 8 | 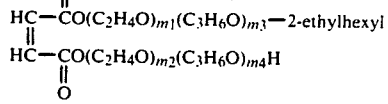  $m_1 + m_2 = 20$  $m_3 + m_4 = 10$ |

The ethylene oxide and propylene oxide are randomly reacted.

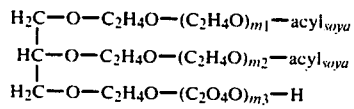

total $m_1 + m_2 + m_3 = 60$

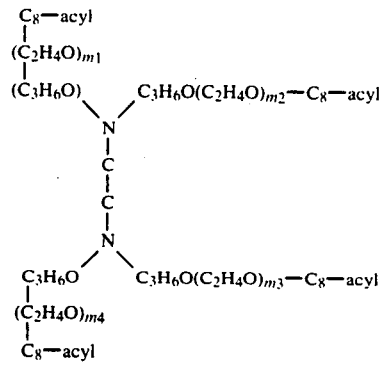

total $m_1 + m_2 + m_3 + m_4 = 60$

The compounds of Examples 7 to 10 have excellent filterability-improving properties.

EXAMPLES 11 to 14

A soft-wood sulphite pulp with 92% α-cellulose produced according to the method and with a resin content of 0.2% was used when preparing the viscose. The pulp was mercerized in an NaOH solution with a concentration of 215 g/l at a temperature of 50° C. according to the slurry method. The NaOH solution contained also 35 g/l hemicellulose. Thereafter, 2 kg per ton of cellulose of the filterability-improving compound shown in Table IV was added. After pressing and ageing, an alkali cellulose having a 33% cellulose content and 15% NaOH was obtained. Carbon disulphide was added at two levels, at 28% and 32%, respectively, calculated on the cellulose in the alkali cellulose. The formed xanthate was dissolved in an aqueous NaOH solution at +10° C., so that a viscose having a 10% cellulose content and 6% NaOH was obtained.

TABLE IV

| Example | Additive |
|---|---|
| 11 | 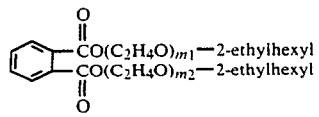  where $m_1 + m_2 = 10$ |
| 12 | 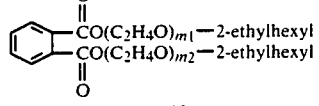  where $m_1 + m_2 = 45$ |
| 13 | Alkoxylated castor oil (1 mole castor oil + 3 moles butylene oxide + 75 moles ethylene oxide) |
| 14 | Alkoxylated castor oil (1 mole castor oil + 6 moles propylene oxide and 20 moles ethylene oxide) |

The compounds of Examples 11 to 14 gave a viscose with considerably improved filterability.

EXAMPLES 15 to 21

A soft-wood sulphate pulp having a 94% α-cellulose content and a resin content of 0.01% as in Examples 1 to 3 was used when preparing the viscose. The pulp was mercerized in an aqueous 18% NaOH solution at 53° C. according to the clurry method and with an addition of 2 kg, calculated per ton of pulp, of a filterability improving agent as shown in Table V. After removal of excess caustic liquor by pressing and ageing, an alkali cellulose having a 33% cellulose content and containing 15% NaOH was obtained. Carbon disulphide was added at two levels, at 29.5% and 32%, respectively, calculated on the cellulose content in the alkali cellulose. The xanthate was dissolved in the NaOH solution so that a viscose having a 10% cellulose content and containing 5.8% NaOH was obtained. The dissolution took place at 4° C. over three hours.

The $k_w$-value (clogging value) was determined for these viscose solutions, with the results shown in Table V.

TABLE V

Filterability-improving agent

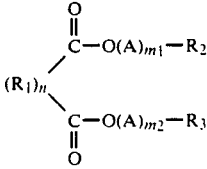

| | | | | | $k_w$ $CS_2$ | |
|---|---|---|---|---|---|---|
| Example | % $C_2H_4O$ | $m_1$ | $m_2$ | $R_2$ | 29.5% | 32% |
| 15 | 100 | 5 | 5 | 2-ethyl hexyl | 1 | 170 |
| 16 | 100 | 10 | 10 | 2-ethyl hexyl | 137 | 163 |
| 17 | 100 | 20 | 20 | 2-ethyl hexyl | 195 | 195 |
| 18 | 100 | 25 | 25 | 2-ethyl hexyl | 1 | 260 |
| 19 | 90 | 15 | 15 | 2-ethyl hexyl | 114 | 1 |
| 20 | 50 | 15 | 15 | 2-ethyl hexyl | 185 | 1 |
| 21 | 100 | 15 | 0 | H | 164 | 1 |

[1] not carried out

The results show that the compounds according to the invention have excellent or very good filterability-improving properties. They are all clearly superior to the control in Examples 1 to 3.

Having regard to the foregoing disclosure the following is claimed as the inventive and patentable embodiments thereof:

1. A process for improving the filterability of a viscose solution which comprises adding to the viscose solution an amount sufficient to improve the filterability within the range from about 0.01 to about 1% by weight calculated on the weight of the cellulose of a compound selected from the group consisting of (1) compounds having the formula:

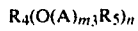

where n is 0 or 1; $R_1$ is a hydrocarbon group having from one to about twenty carbon atoms; A is an alkyleneoxy group having alkylene groups having from two to four carbon atoms, provided that at least 50% of the alkyleneoxy groups are ethyleneoxy groups; $m_1$ and $m_2$ are numbers from 0 to 30, the total of $m_1 + m_2$ being within the range from 2 to about 60; $R_2$ and $R_3$ are selected from the group consisting of hydrogen and hydrocarbon groups having from one to twenty-four carbon atoms provided that not more than one of $R_2$ and $R_3$ is hydrogen; and (2) compounds having the formuls:

$$R_4(O(A)_{m_3}R_5)_n$$

where $R_4$ is an aliphatic group having from one to about twenty-four carbon atoms, and from none to two nitrogen atoms; $R_5$ is selected from the group consisting of hydrogen and acyl groups having from one to about twenty-four carbon atoms, provided that all $R_5$ are not simultaneously hydrogen; $m_3$ is a number from 0 to 30, the total of $m_3$ being a number from 2 to 100; n is a number from 2 to 6 and A has the meaning given in formula I.

2. Process according to claim 1, in which the filterability-improving compound is a compound (1), where $R_1$ is a hydrocarbon group having from two to six carbon atoms, A comprises at least 75% ethyleneoxy units, the toatl of $m_1$ and $m_2$ is from 8 to 45, and $R_2$ and $R_3$ is a hydrocarbon group of four to twelve carbon atoms.

3. Process according to claim 1, in which the filterability-improving compound is a compound (2), where $R_4$ is an aliphatic group having from two to twelve carbon atoms and 0 to 1 nitrogen atom, $R_5$ is an acyl group having from two to twenty-two carbon atoms, the total of $m_3$ is a number from 8 to 50, n is a number from 2 to 4, and A comprises at least 75% ethyleneoxy units.

4. Process according to claim 1, in which the filterabiltiy-improving compound is added during the mercerization.

5. Process according to claim 1, in which the filterability-improving compound is added to the wet pulp line.

6. Process according to claim 1, in which the filterability-improving compound is added in an amount of from 0.05 to 0.5%, calculated on the weight of the cellulose.

7. A viscose solution having good filterability comprising viscose cellulose and a filterability-improving compound according to claim 1.

8. A viscose solution according to claim 7 in which the filterability-improving compound is a compound (1).

9. A viscose solution according to claim 7 in which the filterability-improving compound is a compound (2).

* * * * *